Sept. 30, 1924.

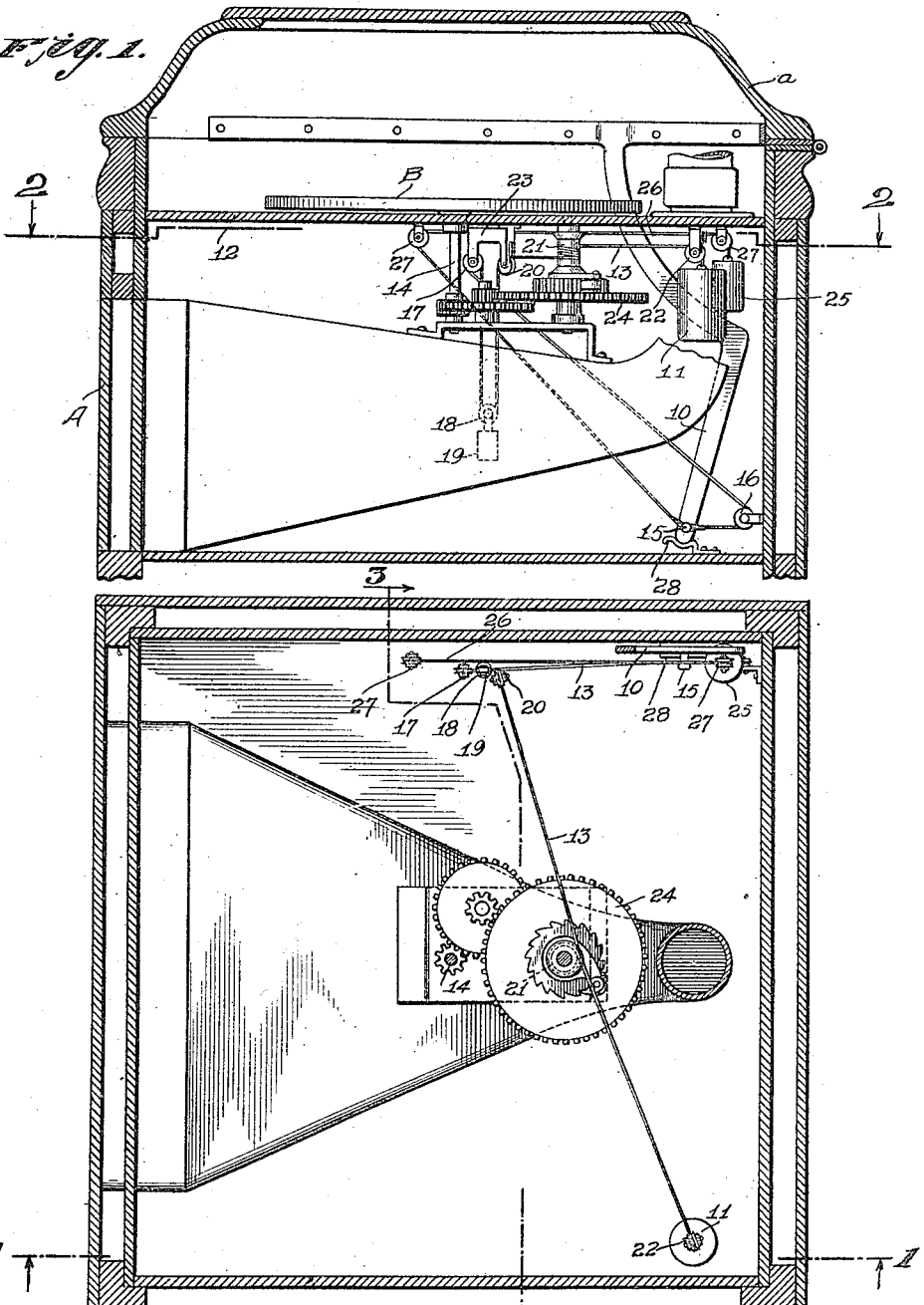

A. A. BREDER 1,510,381

DRIVE MEANS FOR PHONOGRAPHS

Filed March 1, 1921

WITNESSES

INVENTOR
A.A. BREDER
BY
ATTORNEYS

Patented Sept. 30, 1924.

1,510,381

UNITED STATES PATENT OFFICE.

AUGUST A. BREDER, OF EGG HARBOR CITY, NEW JERSEY.

DRIVE MEANS FOR PHONOGRAPHS.

Application filed March 1, 1921. Serial No. 448,757.

*To all whom it may concern:*

Be it known that I, AUGUST ANTHONY BREDER, a citizen of the United States, and a resident of Egg Harbor City, in the county of Atlantic and State of New Jersey, have invented a new and Improved Drive Means for Phonographs, of which the following is a description.

The general object of my invention is to provide gravity motor means adapted to actuate the record table of a phonograph and arranged so that a weight will be raised with the raising of the cover of the phonograph cabinet to cause the table to be turned, by the descent of the weight, through a suitable drive means.

Reference is to be had to the accompanying drawings forming a part of this specification, it being understood that the drawings are merely illustrative of one example of the invention.

Figure 1 is a longitudinal vertical section of the upper portion of a phonograph embodying my invention, the tone-arm being broken away;

Figure 2 is a horizontal section on the line 2—2, Figure 1;

Figure 3:
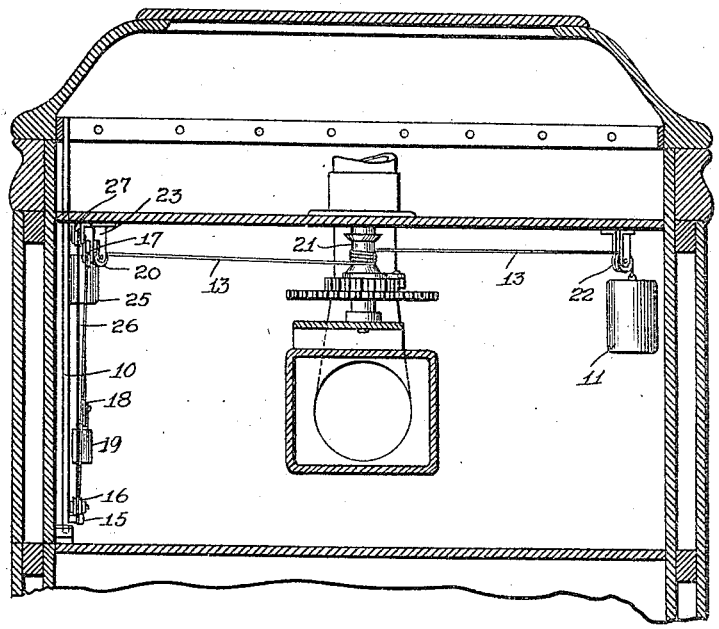
Figure 3 is a transverse vertical section on the line 3—3, Figure 2.

In carrying out my invention in practice in accordance with the illustrated example, a lever 10 is provided, the upper end of which is suitably secured to the cover $a$ of the cabinet. A weight 11 within the cabinet beneath the fixed top 12 thereof is suspended from a cable 13 running to a connection with the lever 10 for raising the weight, the weight passing over suitable guides and turning a drum having driving connection with the vertical shaft 14 of the record table B. In the illustrated example the lever 10 has a lateral pin 15 secured to the cable 13. Said cable runs over a sheave 16, then upwardly to a sheave 17 and about the sheave of a fall-block 18 having a suspended weight 19, the cable running over said fall-block upwardly to and over a sheave 20 and is given a plurality of turns about the drum 21 from which the cable runs over a sheave 22 to a suspending connection with the weight 11. The purpose of the fall-block 18 and weight 19 is for permitting the cover $a$ to be raised without affecting the weight or the motor after the weight has been raised. Thus, the cover $a$ may be freely raised and lowered without interfering with the playing of the unplayed part of a record.

With the described arrangement the weight 11 being assumed to be in the lowered position, the block 18 and weight 19 will have been raised to a position adjacent to the sheaves 17 and 20 close against the hanger bracket 23 in which said sheaves are mounted. The descent of the weight 11 raises the block 18 because the cable departs to the sheave 20 and sheave 22 in opposite directions from the drum 21. Hence, in the descent of the weight the pull at that end of the cable will turn the drum 21 so that the cable will wind off the drum at one side and will wind onto the drum at the other side. By the time the weight 11 will have reached the limit of its descent the block 18 and weight 19 will have been raised. Hence, the raising of the cover and a consequent upward and forward movement of lever 10 and its pin 15 will cause the cable to run through the sheaves 17, 18 and 20 and turn the drum 21, the cable winding off the drum 21 toward the sheave 20 by the pull on the lever, and, winding onto the drum the part of cable between said drum and weight 11, thereby raising said weight. With the lowering of the cover the weight 11 will remain in the raised position, since the brake or stop will be in action to prevent the table B from turning. Therefore, as the cover moves toward the lowered position the weight 19 is free to fall and take up the slack due to the receding movement of the lever 10 from the forward raised position. Hence, during the descent of the weight 11 and the playing of the record the cover may be raised as may be desired without influencing the weight 11 or stopping the table because in the said raising of the cover the fall block 18 and its weight 19 will be alone affected, and not the unplayed part of record.

Any suitable or known drive connection may be employed between the drum 21 and the shaft 14 of the table, there being shown in the illustrated example a clock train designated generally by the numeral 24.

In order to partially counter-balance the weight 11 in the raising of the cover A and the raising of the weight 11 I provide a counter-balance weight 25 suspended from a cable 26 and running over sheaves 27 or other suitable guides to a connection with the pin 15 of lever 10. Hence the weight 25 does not take from the potentiality of the weight 11 when the latter is descending because the lever 10 has no movement, nor does it counteract the weight 11, the slack for the descent of the weight 11 being afforded by that portion of the cable suspending the fall-block 18 and weight 19. To hold the lever against movement until it is positively actuated with the raising of the cover a, I provide a spring catch 28 on any convenient fixed part of the cabinet with which the free end of the lever is adapted to engage when the cover is in the lowered position.

I would state in conclusion that while the illustrated example constitutes a practical embodiment of my invention, I do not limit myself to the mechanical details herein illustrated, since manifestly the same can be considerably varied without departure from the spirit of the invention as defined in the appended claims.

Having thus described my invention, I claim:

1. In a phonograph and cabinet, a weight adapted to operate the record table, means to raise the weight with the lifting of the cabinet cover and means to permit the weight to descend independently of cover movements, said weight being suspended on a cord winding on a shaft below the record table.

2. In a phonograph and cabinet, a weight, a cable suspending said weight, a record table drive operable through the medium of said cable in the descent of the weight, said cable being subject to the lifting of the cover to exert a pull on the cable for lifting the weight, and means subject to the raising of the weight to dispose said cable to respond to movements of the cover without affecting the weight when descending.

3. In a phonograph and cabinet, a weight, a cable suspending said weight, a record table drive operable through the medium of said cable in the descent of the weight, said cable being subject to the lifting of the cover to exert a pull on the cable for lifting the weight, together with a weighted fall block hung on said cable to take up slack as the cover is lowered after the weight is raised.

4. In a phonograph, a weight adapted to operate the record table of the phonograph, means for raising the weight with the opening of the cover of the phonograph cabinet and a counter-weight associated with said means for aiding the cover in raising said first-named weight.

5. In a phonograph and cabinet, weighted means for operating the record table of the phonograph, and means associated with said weighted means for raising the latter when the cabinet cover is raised, together with means permitting a raising of the cover independent of said weighted means once the latter have been raised to their operative position.

AUGUST A. BREDER.